United States Patent
Kemoun

(10) Patent No.: US 7,820,120 B2
(45) Date of Patent: Oct. 26, 2010

(54) DEVICE FOR A REACTOR AND METHOD FOR DISTRIBUTING A MULTI-PHASE MIXTURE IN A REACTOR

(75) Inventor: Abdenour Kemoun, Pleasant Hill, CA (US)

(73) Assignee: Chevron U. S. A. Inc., San Ramon, CA (US)

( * ) Notice: Subject to any disclaimer, the term of this patent is extended or adjusted under 35 U.S.C. 154(b) by 306 days.

(21) Appl. No.: 12/002,769

(22) Filed: Dec. 19, 2007

(65) Prior Publication Data

US 2009/0162266 A1 Jun. 25, 2009

(51) Int. Cl.
*B01J 19/00* (2006.01)
(52) U.S. Cl. ........................ 422/224; 422/140
(58) Field of Classification Search ................. 422/140, 422/139, 194, 195, 220, 224, 230, 231
See application file for complete search history.

(56) References Cited

U.S. PATENT DOCUMENTS

| | | | |
|---|---|---|---|
| 4,457,834 A | 7/1984 | Caspers et al. | |
| 4,539,183 A | 9/1985 | Clark et al. | |
| 4,875,995 A | 10/1989 | Van Driesen et al. | |
| 4,925,638 A | 5/1990 | Chakravarti et al. | |
| 4,960,571 A | 10/1990 | Bhagat et al. | |
| 5,021,147 A | 6/1991 | Van Driesen et al. | |
| 6,183,702 B1 | 2/2001 | Nguyen et al. | |
| 6,278,034 B1 | 8/2001 | Espinoza et al. | |
| 6,454,932 B1 | 9/2002 | Baldassari et al. | |
| 6,726,832 B1 | 4/2004 | Baldassari et al. | |
| 2006/0047142 A1* | 3/2006 | Wonders et al. ............. 422/140 |
| 2006/0078483 A1 | 4/2006 | Kemoun et al. | |
| 2007/0140927 A1 | 6/2007 | Reynolds | |

OTHER PUBLICATIONS

U.S. Appl. No. 12/002,772, filed Dec. 19, 2007, inventor Abdenour Kemoun.
U.S. Appl. No. 12/002,771, filed Dec. 19, 2007, inventor Abdenour Kemoun.
U.S. Appl. No. 12/002,770, filed Dec. 19, 2007, inventor Abdenour Kemoun.

* cited by examiner

*Primary Examiner*—Walter D Griffin
*Assistant Examiner*—Timothy Cleveland

(57) ABSTRACT

An up-flow reactor includes a reaction chamber, and a distributor device disposed in the reaction chamber for distributing a multi-phase mixture therein. The distributor device includes a first pipe adapted for conducting a gas phase, and including first discharge ports, a second pipe adapted for conducting a slurry or a liquid phase, and including second discharge ports, and a plurality of nozzles. Each nozzle communicates a pair of the first and second discharge ports with a venturi outlet of the nozzle, such that pressurized gas phase from the first discharge port passing through the venturi outlet creates a negative pressure for drawing-in the slurry or the liquid phase to be mixed with the gas phase in the venturi outlet.

18 Claims, 2 Drawing Sheets

DEVICE FOR A REACTOR AND METHOD FOR DISTRIBUTING A MULTI-PHASE MIXTURE IN A REACTOR

FIELD OF ART

Disclosed is a distributor device for feeding a gas phase and a slurry or liquid phase, which is useful, for example, in upgrading heavy hydrocarbons admixed with a catalyst slurry and a hydrogen gas, as well as a method for using the distributor device.

BACKGROUND

Liquid recirculating reactors have been proposed in which a multi-phase mixture, including a gas phase, plus a slurry and/or a liquid phase, is conducted upwardly within a reaction chamber and then recirculated back to the lower portion of the chamber, e.g., through a vertical downcomer disposed in the chamber.

Such an upflow reactor is useful, for example, in the hydroprocessing of heavy hydrocarbons employing liquified catalyst slurry and hydrogen gas. See, for example, U.S. Patent Application Publication No. 2007/0140927, the disclose of which is incorporated herein by reference.

The components of the mixture are initially introduced into the lower portion of the chamber and are distributed therein by a distribution tray. It is important to obtain a proper mixing of the components and achieve a high dispersion of the bubbles of the gas phase, to promote the reaction and establish proper flow patterns in the reactor.

It would be desirable therefore, to enhance the mixing of the multi-phase components.

SUMMARY

One aspect of the present disclosure relates to a device for distributing a multi-phase mixture in a reactor. The device includes a first pipe adapted for conducting a gas phase, a second pipe adapted for conducting a slurry or a liquid phase, and a plurality of nozzles. Each nozzle includes passages communicating the first and second pipes with a venturi outlet of the nozzle such that pressurized gas phase from the first pipe passing through the venturi outlet creates a negative pressure for drawing-in the slurry or the liquid phase, wherein the slurry or the liquid phase is mixed with the gas phase in the venturi outlet.

Another aspect of the present disclosure relates to an upflow reactor which incorporates that distributor device.

Yet another aspect of the present disclosure relates to a method of distributing a multi-phase mixture in a reaction chamber of a reactor, comprising:

A) communicating a source of slurry or a liquid phase and a source of pressurized gas phase with each of a plurality of nozzles disposed in the chamber, B) conducting the pressurized gas phase through venturi outlets of the nozzles to create a negative pressure which draws the multi-phase mixture into the venturi outlet; and C) discharging the gas phase and the slurry or liquid phase as a multi-phase mixture from the venturi outlet and into the chamber.

BRIEF DESCRIPTION OF THE FIGURES

FIG. 1c is a fragmentary side elevational view taken in the direction of arrow A in FIG. 1a.

DETAILED DESCRIPTION

Disclosed is a distributor device for achieving a high degree of mixing of multi-phase components, including a gas phase.

A liquid recirculating reactor containing the present distributor device is suitable for hydroconversion employing slurry feeds comprised of heavy oil hydrocarbons and catalysts. Hydroconversion processes include thermal hydrocracking, hydrotreating, hydrodesulphurization, hydrodenitrification and hydrodemetalization In particular, the slurry feed can be admixed with a hydrogen rich gas, for example, at elevated pressure and temperature and hydroprocessed (for example, hydrocracked) for the removal of heteroatom contaminants, such as sulfur and nitrogen.

The present distributor device, for distributing multi-phase components in a reactor, comprises a nozzle having a venturi outlet, a first pipe for feeding a gas phase into the nozzle, and a second pipe for feeding a slurry or liquid phase into the nozzle. A negative pressure created by the gas phase passing through the venturi outlet draws-in the slurry or liquid phase and discharges it through the venture outlet, along with the gas phase, while mixing therewith. The distributor device thus serves to feed as well as mix the multi-phase components.

Figure 1A:
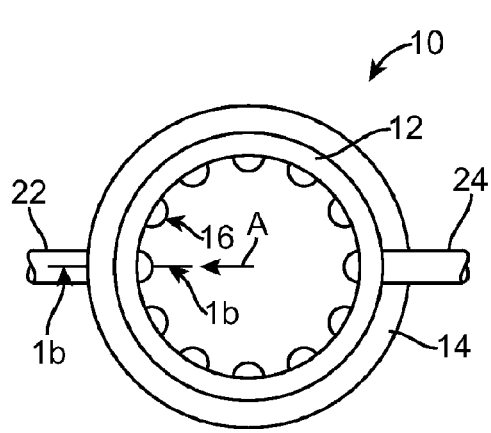
FIG. 1a is a schematic top view of the present distributor device.
Figure 1B:
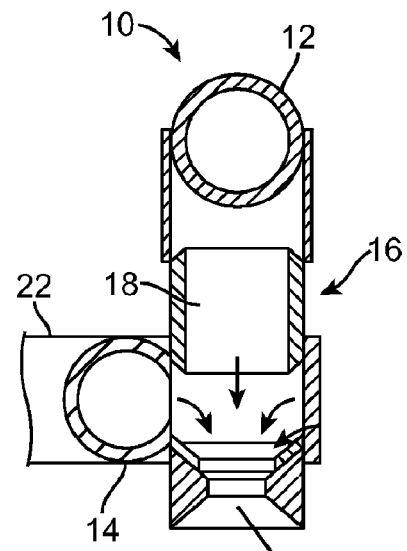
FIG. 1b is a vertical sectional view taken through the device of FIG. 1a along the line 1b-1b.

With reference to FIGS. 1a and 1b the distribution device 10 includes first and second pipes 12, 14 which can be elongated in a curved direction, for example, ring-shaped as shown. Attached between the pipes 12, 14, for example, at spaced locations around the inner circumferences thereof, are nozzles 16. Each nozzle communicates fluidly with both of the first and second pipes 12, 14 via respective passages and includes a nozzle passage 18 terminating in a venturi outlet 20 arranged so that pressurized gas fed from the first pipe 12 into the upper end of the nozzle passage passes through the venturi outlet whereby its speed is increased and pressure is reduced, thereby creating a negative pressure which draws-in the slurry or liquid phase from the second pipe 14. The result is a high degree of mixing and heat exchange between the components.

Figure 1C:
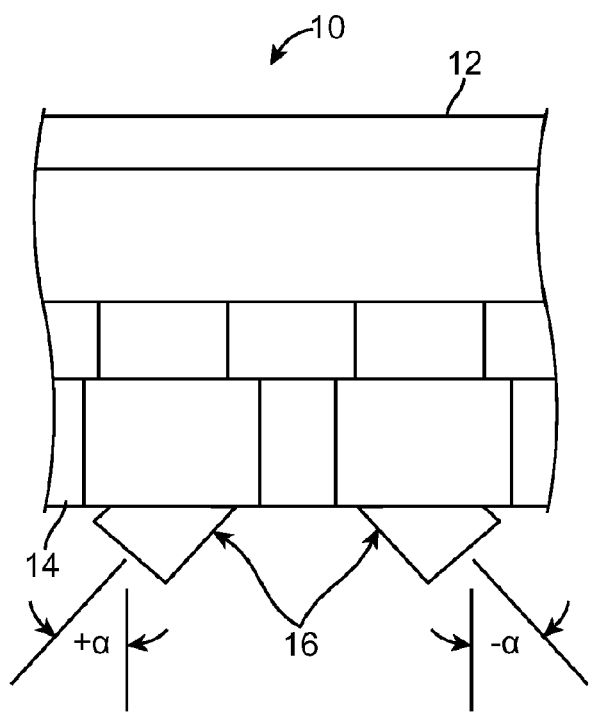

In the ring-type hydrogen distributor device 10 illustrated in FIGS. 1a, 1b, the second ring-shaped pipe 14, having an inlet 22 for slurry or liquid phase, is disposed below the first ring-shaped pipe 12 having a hydrogen gas inlet 24. The outlets of the nozzles 16 are directed in a generally downward direction. Although the outlets of the nozzles could be directed vertically downwardly, some or all of the outlets can be directed at an angle relative to vertical, e.g., within a range up to ±45 degrees, in any desired pattern. Thus, for example, some nozzles could be directed at +45 degrees and others at −45 degrees as shown in FIG. 1c, or at angles therebetween.

Although the device 10 is depicted as discharging the components in a downward direction, it could instead be inverted so as to discharge the components upward, i.e., vertically or at an angle to vertical.

The components delivered to the pipes 12, 14 can be recirculated from a reaction chamber via a pump, or can constitute fresh components.

Each nozzle can have a diameter at its widest point of from about ½ inch to about 4 inches, for example, from about 1 inch to about 2 inches. The diameter at the nozzles' narrowest point can be from about ¼ inch to about 2 inches, for example, from about ½ inch to about 1 inch.

The nozzle can produce a fluid spray pattern, wherein a ratio of a diameter of the fluid spray pattern to a diameter of a widest point of the nozzle is from about 1:1 to about 10:1, for example, from about 3:1 to about 7:1.

The distributor device 10 can be disposed near the bottom of an up-flow reactor comprising a downcomer centered in the reactor, and a conventional distributor plate can be disposed above the device.

The reactor can also comprise a distributor device that feeds the slurry or the liquid and the gas into the reactor near a top of the reactor. The reactor can further comprise a conduit at the top of the reactor that feeds the slurry or the liquid into the downcomer. The reactor can further comprise an internal or external recirculation pump for circulating the multi-phase mixture in the reactor.

Figure 2:
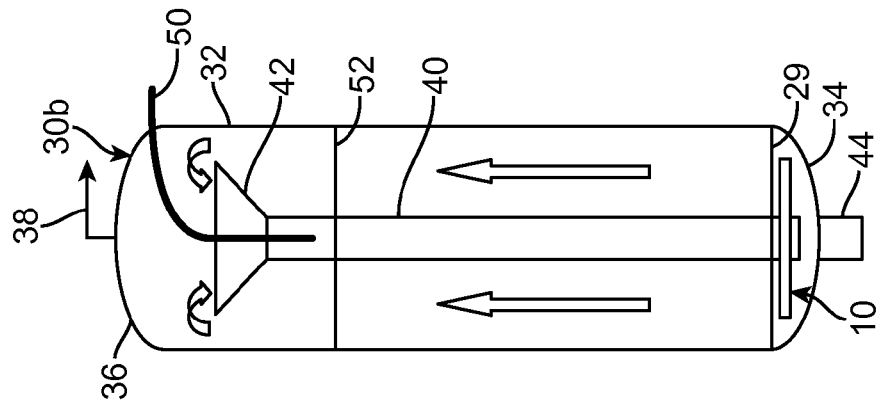
FIG. 2 is a schematic side view of a first embodiment of a liquid recirculating reactor containing the present distributor device.

FIG. 2 is a schematic view of a first embodiment of a liquid recirculating reactor 30 containing the present distributor device 10 located below an optional conventional distributor plate 29. That is, the distributor device could replace the distributor plate 29.

The reactor 30 comprises a cylindrical casing 32 to which are attached an end piece 34 and a roof 36. Hydrogenated hydrocarbons and unreacted hydrogen can be withdrawn from locations near the top of the reactor, and liquid product can be separated from catalyst particles by either internal or external separation. Unreacted hydrogen withdrawn through the overhead product withdrawal line 38 can be recycled.

Material not removed can be recirculated through the downcomer 40, thereby keeping the catalyst concentration profile and temperature profile along the length of the reactor 30 as even as possible, thus maintaining the bubble flow regime. The downcomer 40 comprises at its upward end a cone 42 which permits gas bubbles to escape from the multi-phase mixture that enters the upper end of the downcomer 40. The downcomer 40 transports the degassed slurry to a lower point in the reactor 30. In an embodiment, sufficient hydrogen is introduced so that the superficial gas velocity through the reactor 30 is from about 2 to 6 cm/s. A recirculation pump 44 discharges material near the distributor device 10.

Figure 3:
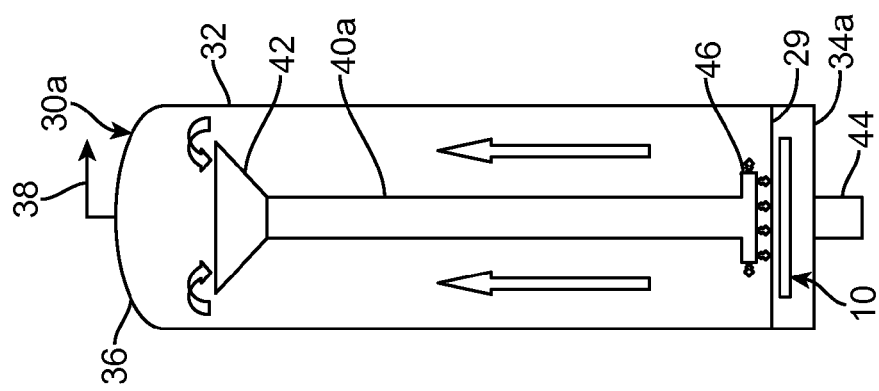
FIG. 3 is a schematic side view of a second embodiment of a liquid recirculating reactor containing the present distributor device.

FIG. 3 is a schematic view of a second embodiment of a liquid recirculating reactor 30a containing the present distributor device 10 disposed below a distributor plate 29. As illustrated in FIG. 3, the end piece 34a can be flat-bottomed, as opposed to round-bottomed. As further illustrated in FIG. 3, the downcomer 40a can: (1) terminate above the distributor device 10, as opposed to below the distributor device 10; (2) have a width at its bottom which is wider than its width at other points along its length; and/or (3) have outlets 46 in a horizontal direction in addition to a downward, vertical direction.

Figure 4:
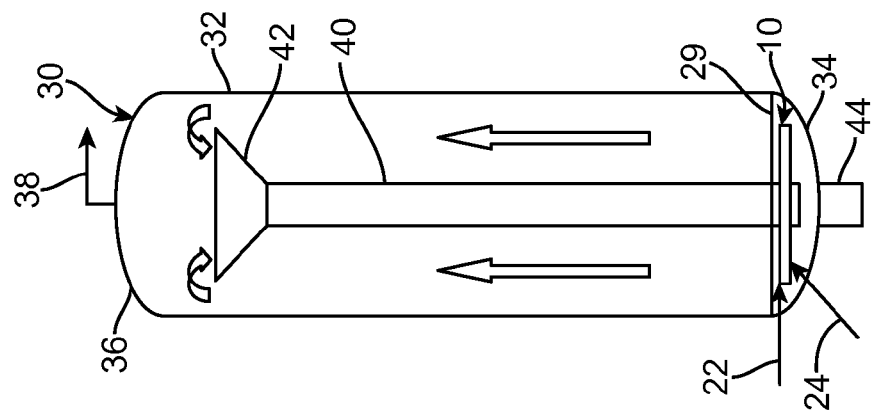
FIG. 4 is a schematic side view of a third embodiment of a liquid recirculating reactor containing the present distributor device.

FIG. 4 is a schematic view of a third embodiment of a liquid recirculating reactor 30b containing the present distributor device 10 disposed below a distributor plate 29. As illustrated in FIG. 4, the liquid recirculating reactor 30b can optionally additionally comprise a feed pipe 50, for the addition of liquid/catalyst slurry to the downcomer, and/or optionally additionally comprise a conduit 52 adjacent the top of the reactor 30b for introducing a component to reduce slurry foaming in the reactor 30b. The second distributor device 52 can be the presently-disclosed ring-type distributor device 10 in which the hydrogen gas is replaced by a suitable liquid.

Many modifications of the exemplary embodiments disclosed herein will readily occur to those of skill in the art. Accordingly, the present disclosure is to be construed as including all structure and methods that fall within the scope of the appended claims.

What is claimed is:

1. A device for distributing a multi-phase mixture in a reactor, comprising:
    a first pipe adapted for conducting a gas phase;
    a second pipe adapted for conducting a slurry or liquid phase; and
    a plurality of nozzles for communicating fluidly with both the first and second pipes, each nozzle terminating in a venturi outlet, each nozzle including a passage for communicating the first and second pipes with the venturi outlet of the nozzle such that pressurized gas phase from the first pipe passing through the venturi outlet creates a negative pressure for drawing-in the slurry or liquid phase,
    wherein the slurry or liquid phase is mixed with the gas phase in the venturi outlet.

2. The device according to claim 1, wherein each of the first and second pipes is elongated and includes a plurality of respective first and second discharge ports, wherein the nozzle is associated with each pair of first and second discharge ports.

3. The device according to claim 2, wherein each of the first and second pipes is ring-shaped, and respective center axes of the ring-shaped pipes are substantially coincident with each other, and wherein the plurality of the nozzles are arranged in a ring-shaped pattern between the first and second pipes.

4. The device according to claim 3, wherein the venturi outlet is arranged to admit the slurry or the liquid phase in surrounding relationship to the gas phase.

5. The device according to claim 1, wherein some of the venturi outlets being directed at different respective angles relative to vertical.

6. An up-flow reactor comprising:
    a reaction chamber;
    a distributor device disposed in the reaction chamber for distributing a multi-phase mixture in the chamber, the distributor device comprising: a first pipe adapted for conducting a gas phase, and including first discharge ports; a second pipe adapted for conducting a slurry or a liquid phase, and including second discharge ports; and a plurality of nozzles, each nozzle terminates in a venturi outlet, and each nozzle is for communicating the first and second discharge ports with the venturi outlet of the nozzle, such that pressurized gas phase from the first discharge port passing through the venturi outlet creates a negative pressure for drawing-in the slurry or the liquid phase to be mixed with the gas phase in the venturi outlet.

7. The reactor according to claim 6, wherein each of the first and second pipes is ring-shaped, and respective center axes of the first and second ring-shaped pipes are substantially coincident with each other, and the plurality of nozzles are arranged in a ring-shaped pattern between the first and second pipes.

8. The reactor according to claim 7, wherein each nozzle is arranged to admit the multi-phase mixture in surrounding relationship to the gas phase.

9. The reactor according to claim 6, wherein some of the venturi outlets are directed at different respective angles relative to vertical.

10. The reactor according to claim 9, wherein the nozzles are directed downwardly.

11. The reactor according to claim 9, wherein the nozzles are directed upwardly.

12. The reactor according to claim 9, further including a distributor plate above the distributor device.

13. The reactor according to claim 6, wherein each nozzle passage has a diameter at its widest point of from about ½ inch to about 4 inches.

14. The reactor according to claim 6, wherein the nozzle produces a fluid spray pattern, a ratio of a diameter of the fluid spray pattern to a diameter of a widest point of the nozzle passage being from about 3:1 to about 7:1.

15. The reactor according to claim 6, further including a downcomer disposed in the chamber for recirculating the multi-phase mixture.

16. The reactor according to claim 15, wherein the distributor device is located nearer to a bottom of the chamber than to a top thereof.

17. The reactor according to claim 8, further comprising an additional distributor device for distributing liquid into the chamber and disposed closer to a top of the chamber than to a bottom thereof.

18. The reactor according to claim 15, further comprising a conduit arranged adjacent a top of the reactor for feeding slurry or a liquid phase downwardly into the downcomer.

* * * * *